United States Patent [19]
Lucas, Jr.

[11] Patent Number: 5,816,650
[45] Date of Patent: Oct. 6, 1998

[54] UNDERSEAT STORAGE BIN FOR MOTOR VEHICLES

[75] Inventor: Earl Clyde Lucas, Jr., Auburn Hills, Mich.

[73] Assignee: Lear Corporation, Southfield, Mich.

[21] Appl. No.: 803,996

[22] Filed: Feb. 21, 1997

[51] Int. Cl.⁶ .................................................. A47C 7/62
[52] U.S. Cl. ............................. 297/188.1; 297/188.13; 297/344.1
[58] Field of Search ............................. 297/183.1, 188.1, 297/188.09, 188.08, 188.13, 188.01, 344.1, 331

[56] References Cited

U.S. PATENT DOCUMENTS

| | | | |
|---|---|---|---|
| 2,268,199 | 12/1941 | Greer | 297/188.1 X |
| 3,362,746 | 1/1968 | Huyge | 297/344.1 X |
| 4,519,646 | 5/1985 | Leitermann et al. | 297/15 |
| 4,883,317 | 11/1989 | Davenport | 297/188.1 |
| 5,015,033 | 5/1991 | Winters | 297/192 |
| 5,249,724 | 10/1993 | Green | 224/275 |
| 5,622,404 | 4/1997 | Menne | 297/188.1 |

*Primary Examiner*—Milton Nelson, Jr.
*Attorney, Agent, or Firm*—Brooks & Kushman PC

[57] ABSTRACT

A seat assembly for an interior of a motor vehicle interior is disclosed. A pair of opposed side walls extend upwardly from a floor of the vehicle, and a guide track disposed on an upper surface of the each of the side walls. A seat frame is movable along the guide track, with a seat back connected to a rear end of the seat frame. A cushion is connected to the seat frame proximate a front end of the seat frame, and pivotal between a closed position and an open position. A bin is disposed generally below the cushion and accessible when the cushion is pivoted to the open position. The bin is engaged with the seat frame and movable therewith when the seat frame is moved along the guide track. Optionally, the bin is fastened to the seat frame, and accessible through a door disposed proximate the rear end of the seat frame.

15 Claims, 2 Drawing Sheets

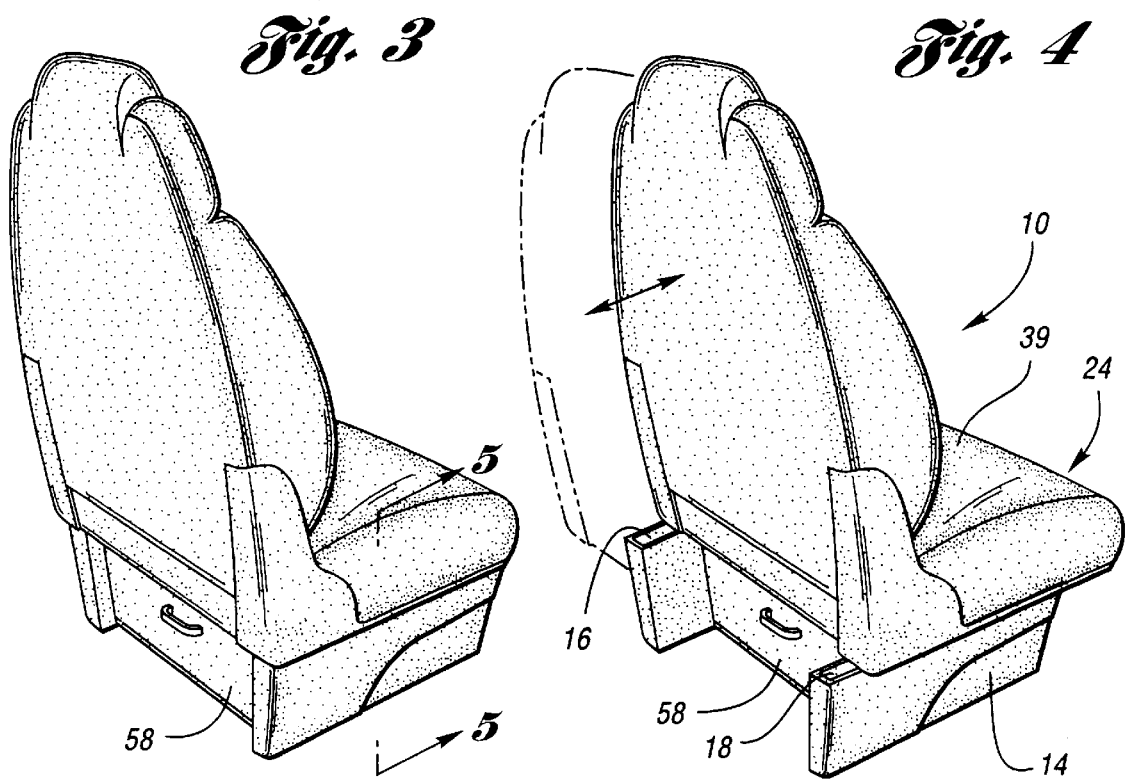
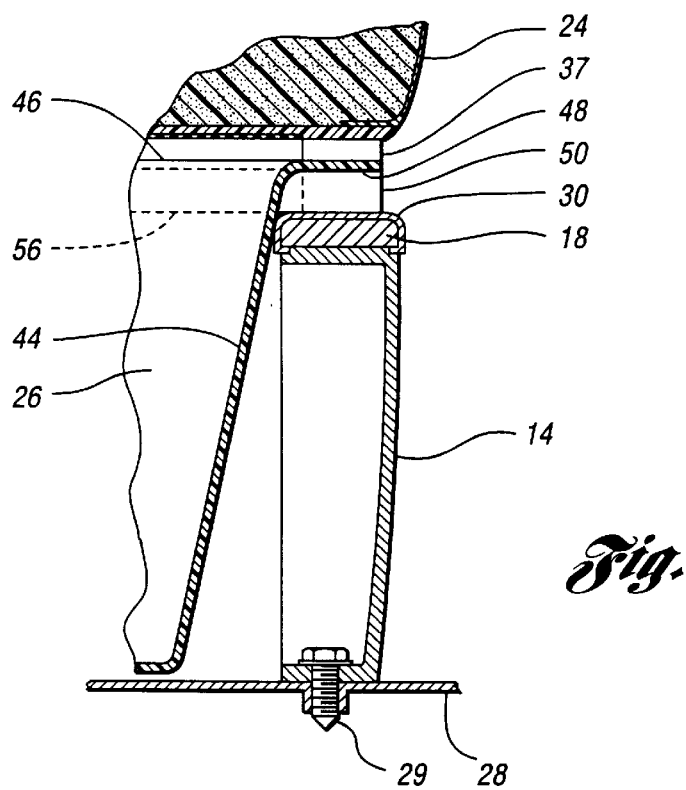

5,816,650

UNDERSEAT STORAGE BIN FOR MOTOR VEHICLES

TECHNICAL FIELD

This invention relates to motor vehicle seats having storage compartments, and more particularly to a storage bin situated generally underneath the seat of the motor vehicle.

Background Art

Various areas in motor vehicles have traditionally been dedicated to the storage of small items. Most vehicles, for example, are equipped with glove compartments for the storage of maps, manuals, and other items. More recently, storage space has been provided in areas of the vehicle such as the door panels, the headliner and in a center console between the front seats.

One additional area of the vehicle which has been proposed as storage space is underneath the seats. For instance, U.S. Pat. No. 5,249,724 shows a storage container for sundry articles specifically designed to fit from the rear under the rearmost bench seat of a minivan vehicle. Such an arrangement, however, interferes with or prevents the forward and rearward movement of the seats.

Summary of The Invention

The present invention is a seat assembly for an interior of a motor vehicle. The seat assembly comprises a pair of opposed side walls extending upwardly from a floor of the vehicle, and a guide track disposed on each of the side walls. A seat frame is movable along the guide tracks, the seat frame having a front end and a rear end. A seat back is connected to the seat frame proximate the rear end of the seat frame. A cushion is pivotally connected to the seat frame proximate the front end of the seat frame, the cushion being pivotal between a closed position and an open position. A bin is disposed generally below the cushion, and is accessible when the cushion is pivoted to the open position. The bin is engaged with the seat frame and movable therewith when the seat frame is moved along the guide tracks.

Accordingly, it is an object of the present invention to provide a seat assembly of the type described above which provides additional storage space in a motor vehicle.

Another object of the present invention is to provide a seat assembly of the type described above which provides a storage bin underneath the seat that does not interfere with the forward and rearward movement of the seat.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 3 is a perspective view similar to FIG. 2 and showing the seat cushion and the rear access door in their closed positions;

FIG. 4 is a view similar to FIG. 3 and showing a seat in a forward position; and FIG. 5 is a cross-sectional view taken along line 5—5 in FIG. 3.

BEST MODE FOR CARRYING OUT THE INVENTION

Figure 1:
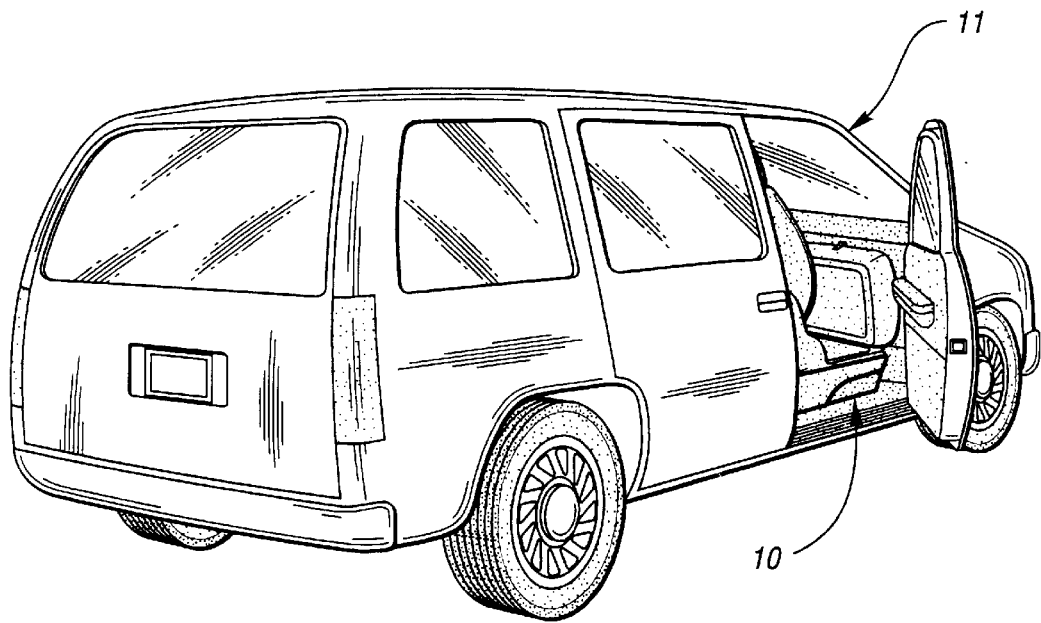
FIG. 1 is a perspective view of a motor vehicle interior including a seat assembly according to the present invention.

With reference to the drawings, the preferred embodiments of the present invention will be described. FIGS. 1 through 5 show a seat assembly 10 according to the present invention for the interior of a motor vehicle 11. The seat assembly 10 comprises a pair of opposed side walls 12 and 14, a pair of guide tracks 16 and 18, a seat frame 20, a seat back 22, a cushion 24 and a bin 26.

The side walls 12 and 14 extend generally upwardly from a floor 28 of the vehicle, and are fastened thereto in any conventional manner such as by bolts 29. The guide tracks 16 and 18 are aligned in parallel in a generally front-to-rear orientation, and are respectively disposed on an upper surface of the side walls 12 and 14. The seat frame 20 includes on its lower surface runners 30 that slide along the respective guide tracks 16 and 18 such that the seat frame is movable between a rearwardmost position shown in FIG. 3 and a forwardmost position shown in FIG. 4 to accommodate occupants of different heights.

The seat frame 20 has a front end 34 and a rear end 36. The seat back 22 is connected by posts 37 to the seat frame 20 proximate the rear end 36 of the seat frame, and may be forwardly pivotable as is well known to facilitate entry into and exit from the vehicle behind the seat assembly 10. The generally rectangular cushion 24 is pivotally connected to the seat frame 20 proximate the front end 34 of the seat frame by a pair of hinges 38. An aesthetic covering 39 is disposed around the upper surface of the cushion 24, and is also preferably disposed around the lower surface of the cushion to cover the springs and other structure inside the cushion which would otherwise be exposed to view when the cushion is in an open position shown in FIG. 2. A looped cloth handle 40 attached to the free end 42 of the cushion allows a user to pivot the cushion from a closed position shown in FIGS. 3 and 4 to the open position.

The bin 26 is disposed generally below the cushion 24, and is accessible when the cushion is pivoted to the open position. The bin 26 has a generally trapezoidal cross-section with tapering side walls 44 best shown in FIG. 5. The bin has an open top, and includes a front flange 46 and opposed side flanges 48. The side flanges 48 rest on a portion 50 of the seat frame above the guide tracks 16 and 18. The front flange 46 rests on a front cross-member 56 of the seat frame 20, and is preferably fastened thereto with one or more rivets 54, screws or other fasteners. Alternately, the fasteners 54 may be omitted so that the bin 26 is removable from below the cushion 24 and up through the seat frame 20. Regardless of whether the bin 26 is fastened thereto, the bin moves with the seat frame 20 when the seat frame is moved among its positions along the guide tracks 16 and 18.

Figure 2:
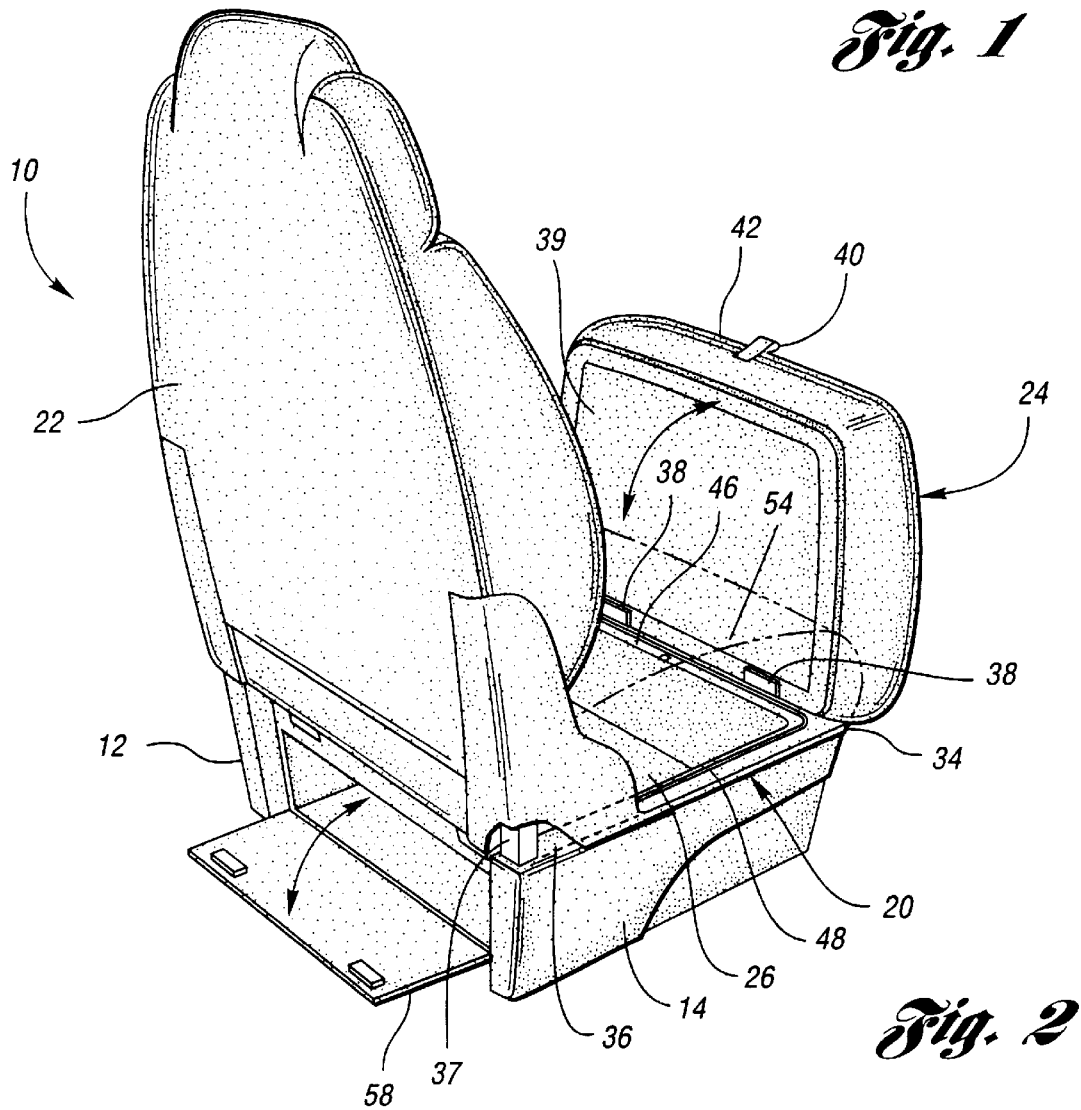
FIG. 2 is a perspective view of the seat assembly apart from the vehicle and showing a seat cushion and a rear access door in their open positions.

The seat assembly 10 may also be provided with a rear access door 58 proximate the rear end of the seat frame 20. The access door 58 may be hinged to either of the side walls 12 or 14 such that the door opens left or right, or may be hinged at its top to either the bottom of the seat back or to the rear end of the seat frame 20 so that the door 58 is movable with the seat frame. Alternately, the access door can be provided in the rear wall of the bin itself, as shown in FIGS. 2, 3 and 4, with the space between the side walls 12 and 14 left vacant. In any of these arrangements, the interior of the bin 26 is accessible from behind the seat assembly 10 when the access door 58 is in an open position. In the instance where the access door 58 is not movable with the seat frame, the rear wall of the bin can be substantially removed so that the interior of the bin is accessible through the opening defined between the rear ends of the opposed side walls, or provided with a second access door. In the further instance where the bin is movable with but not fastened to the seat frame 20, means such as stops may be provided on the side walls 12 and 14 that must be overcome with some force before the bin slides rearwardly out from under the seat assembly 10.

While the present invention is described with reference to the front passenger seat, it should be appreciated that the present invention is equally applicable to the other seats in the vehicle. Thus, it should be understood that while the forms of the invention shown and described constiintended to illustrate all possible forms thereof. It should also be understood that the words used are words of description rather than limitation, and various changes may be made without departing from the spirit and scope of the invention disclosed.

I claim:

1. A seat assembly comprising:
   a pair of opposed side walls extending upwardly from a floor of a vehicle;
   a guide track disposed on each of the side walls;
   a seat frame movable along the guide tracks, the seat frame having a front end and a rear end;
   a seat back connected to the seat frame proximate the rear end of the seat frame;
   a cushion pivotally connected to the seat frame proximate the front end of the seat frame, the cushion being pivotal between a closed position and an open position; and
   a bin disposed generally below the cushion and accessible when the cushion is pivoted to the open position, the bin engaged with the seat frame and movable therewith when the seat frame is moved along the guide tracks.

2. The seat assembly of claim 1 wherein the guide tracks are respectively disposed on an upper surface of each of the side walls.

3. The seat assembly of claim 1 further comprising a fastener connecting the bin to the seat frame.

4. The seat assembly of claim 1 wherein the bin is removably engaged with the seat frame.

5. The seat assembly of claim 1 wherein the bin further comprises a flange removably engaged with a front cross-member of the seat frame.

6. The seat assembly of claim 1 wherein the bin is removable from below the cushion through an opening defined between rear ends of the opposed side walls.

7. The seat assembly of claim 1 wherein the guide track is disposed generally in a front-to-rear orientation.

8. The seat assembly of claim 1 further comprising an aesthetic covering disposed around an upper surface of the cushion and also disposed around a lower surface of the cushion.

9. The seat assembly of claim 1 further comprising means for pivoting the cushion.

10. The seat assembly of claim 1 further comprising a handle attached to the cushion.

11. The seat assembly of claim 1 further comprising a looped handle attached to the cushion.

12. The seat assembly of claim 1 further comprising a looped handle attached to the cushion proximate a free end of the cushion.

13. The seat assembly of claim 1 wherein the cushion is generally rectangular.

14. The seat assembly of claim 1 wherein the bin has a generally trapezoidal cross section.

15. A seat assembly, the seat assembly comprising:
    a pair of opposed side walls extending upwardly from a floor of a vehicle;
    a guide track disposed on an upper surface of the each of the side walls;
    a seat frame movable along the guide tracks, the seat frame having a front end and a rear end;
    a seat back connected to the seat frame proximate the rear end of the seat frame;
    a cushion pivotally connected to the seat frame proximate the front end of the seat frame, the cushion being pivotal between a closed position and an open position;
    a bin disposed generally below the cushion and accessible when the cushion is pivoted to the open position, the bin engaged with the seat frame and movable therewith when the seat frame is moved along the guide tracks;
    a fastener connecting the bin to the seat frame; and
    a door disposed proximate the rear end of the seat frame and movable to an open position such that the bin is accessible from below the cushion through the door.

* * * * *